Oct. 15, 1935.  A. C. LINDGREN  2,017,721
HAY RAKE
Filed June 6, 1934  2 Sheets-Sheet 1
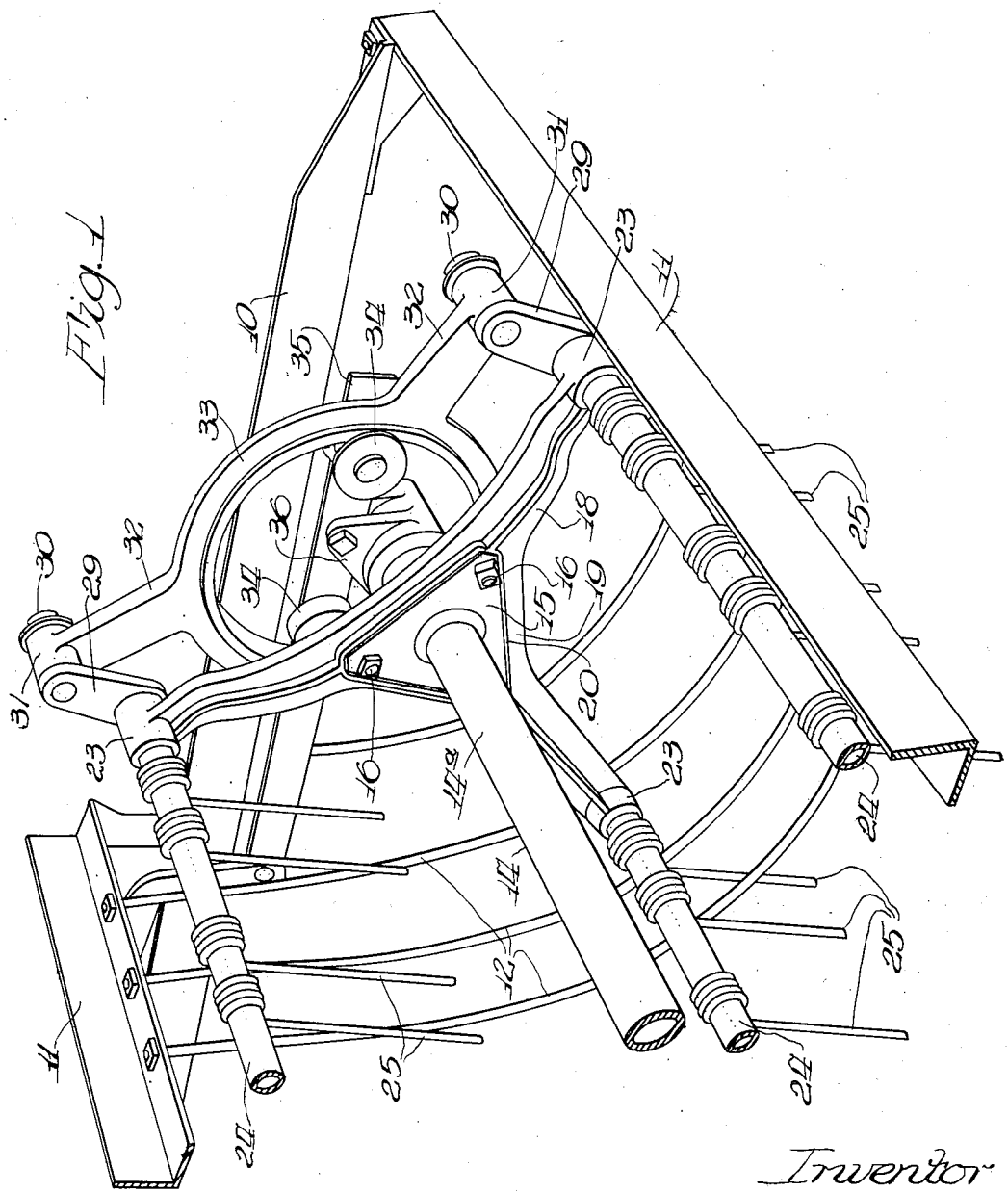

Oct. 15, 1935.  A. C. LINDGREN  2,017,721
HAY RAKE
Filed June 6, 1934  2 Sheets-Sheet 2
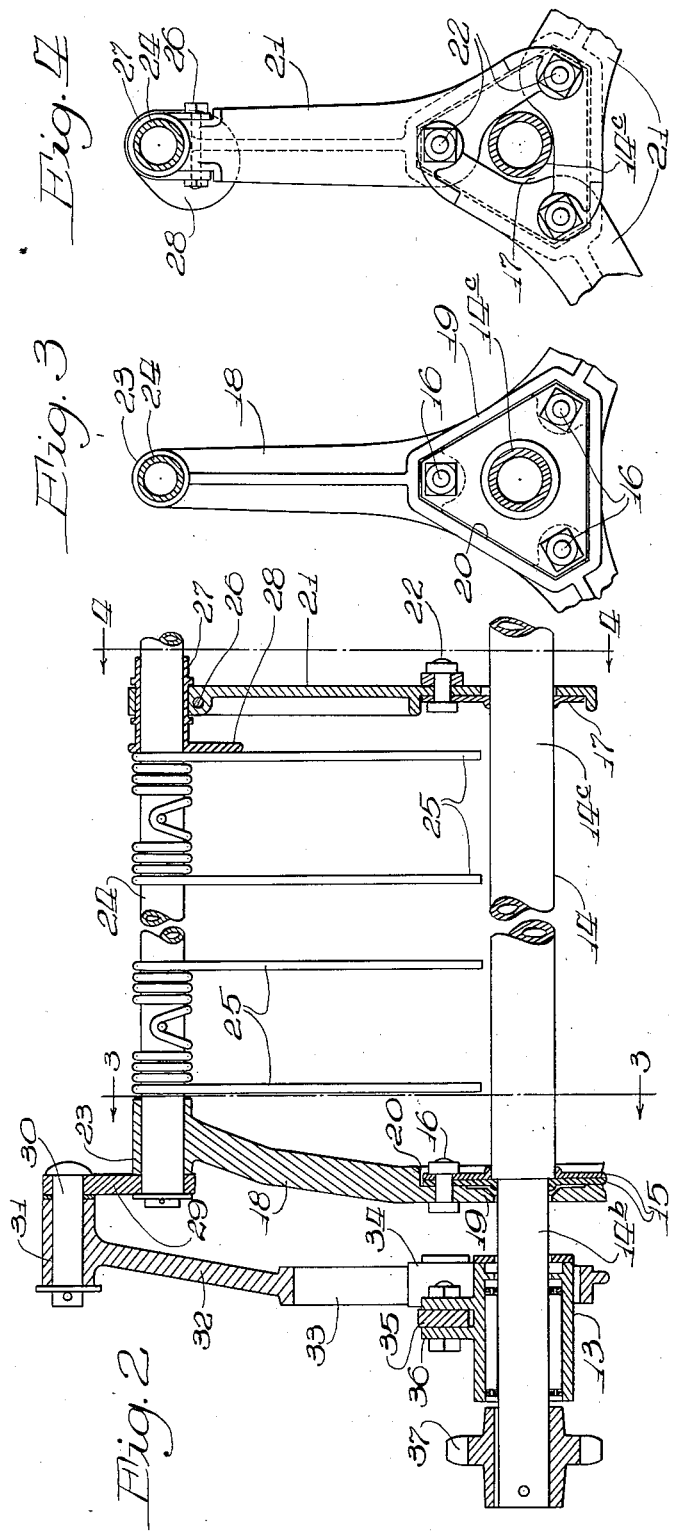
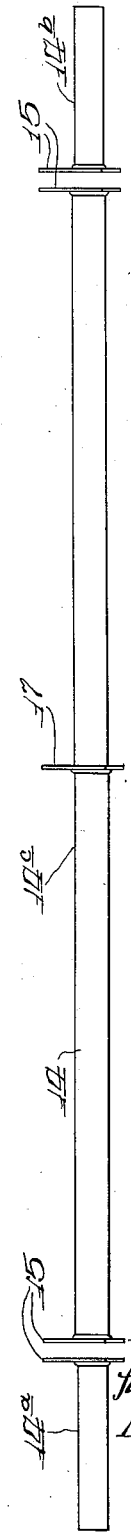
Inventor
A. C. Lindgren
By
Attÿ

Patented Oct. 15, 1935

2,017,721

UNITED STATES PATENT OFFICE 2,017,721

HAY RAKE

Alexus C. Lindgren, Chicago, Ill., assignor to International Harvester Company, a corporation of New Jersey Application June 6, 1934, Serial No. 729,181

8 Claims. (Cl. 56—367)

The invention relates to improvements in hay rakes of the combined side delivery and tedder type.

An object of the invention is to provide an improved light weight, strong, reel shaft construction to facilitate assembly of the reel.

Another object is to provide an improved structure for connecting the reel heads, or spiders, to the reel shaft.

Still another object is to provide an improved means for preventing the teeth on the tooth carrying bars adjacent the spiders from engaging the spiders when the reel rotates.

Other objects will become apparent as the disclosure is more fully made.

In the preferred example of the invention herein to be shown and described these desirable objects are attained by forming the reel shaft of several sections of pipe arranged end to end and having plates welded to the adjoining ends. These ends are bolted together to secure the several sections firmly together to form a continuous, strong, light-weight reel shaft. These plates fit into recessed hub portions of the reel heads, and the same bolts which secure the pipe sections rigidly together also serve to secure the reel heads to the plates. One head at each end of the reel is so secured to the reel shaft. A center plate welded to the shaft is utilized in a similar manner to secure a center reel head to the shaft. The outer ends of the spider arms of the center head are provided with means to prevent the teeth on the tooth bars from contacting these center arms to prevent bending and possible breakage of the teeth.

As shown in the drawings:

Figure 1 is a perspective view of one end of the rake frame and reel, showing the manner of connecting an end reel head to the reel shaft;

Figure 2 is a side elevational view, partly in section, of the same structure shown in Figure 1;

Figure 3 is a detail sectional view through spider arms as taken along the line 3—3 appearing in Figure 2, looking in the direction of the arrows;

Figure 4 is a view similar to Figure 3, but showing a portion of the center reel head as taken along the line 4—4 of Figure 2, looking in the indicated direction; and Figure 5 is an elevational view of the three pipe sections forming the reel shaft, the sections being disassembled and shown in axial alignment.

The rake shown is of the conventional side delivery type having a main frame 10 and a diagonally disposed raking reel frame 11, carrying the usual stripper rods 12. In the conventional manner, not shown, the frame 10 carries a bearing box 13 in which are bearings carrying the forward end of the diagonal reel shaft generally numbered 14 and shown in Figure 5. This shaft is in the form of a pipe and comprises three parts or sections; to-wit, a front pipe stub section 14a; a similar rear short section 14b; and, a main shaft section 14c as long as the reel and of slightly larger diameter than the end sections, as shown. The end section 14b is carried in a bearing box, not shown, similar to the one 13, at the rear end of the frame.

In forming this improved reel shaft 14, the sections thereof are arranged coaxially end to end, as shown in Figure 5. Adjacent ends of the sections are passed through and have welded thereto triangularly shaped plates 15 provided with registering bolt holes, so that bolts 16 passed therethrough serve securely to fasten the sections together to form a continuous, unitary reel shaft, or axle 14. The middle, main pipe section 14c, intermediately of its ends is also provided with another similar triangularly shaped plate 17 welded thereto.

The forward set of plates 15 between the sections 14a and 14c have secured thereto by the same bolts 16, a three armed, one piece spider or reel head 18 having a substantially triangular center, or hub portion, 19 recessed at 20 to receive the plates 15. Each arm of the front head 18 is bent or curved rearwardly, as shown in Figure 2, for a purpose presently to appear. The plates 15 between the shaft sections 14c and 14b in the same way carry a rear reel head, not shown.

As shown in Figures 2 and 4, the intermediate plate 17 on the reel shaft has bolted thereto an intermediate reel head or spider formed of three separate arms 21, each arm being secured at two points by bolts 22 to the plate 17. This inner spider is thus formed of separate arms to facilitate assembly of the reel.

The end reel heads have the outer ends of their arms 18 formed with sleeves 23 to carry the ends of tooth, or rake, bars 24 formed of pipe material. These pipes 24 have secured thereto the usual coil spring teeth 25. The coils on the teeth adjacent the arms 18 cause the end teeth to spread in the direction of the arms 18. To prevent the end teeth from catching on these arms 18, said arms are curved away from the teeth, as previously described. In this way, these end teeth are protected from being damaged.

The free ends of the arms 21 of the center reel head have clamped thereto by bolts 26, sleeves 27 for carrying the middle portions of the tooth carrying pipes 24. Each of these sleeves 27 is extended, as shown in Figure 2, and formed with an extension 28 against which the adjacent tooth 25 is stopped from spreading toward the adjacent arm 21, to prevent the said tooth from possible damage.

As shown in Figures 1 and 2, the ends of the tooth bar pipes 24 carry cranks 29 which are in turn pivotally connected to pins 30 carried in sleeves 31 formed at the outer ends of three arms 32, which in the usual way are part of the tooth angling eccentric 33 carried on rollers 34. These rollers are journaled on a shifter bar 35 pivoted to ears 36 on the bearing box 13. In the usual way, by means not shown, the bar 35 can be shifted to move the eccentric 33 and cause the angle of the teeth 25 to be changed, as desired. The shaft 14 is driven from a sprocket wheel 37 in the conventional manner, to rotate the reel.

From this detailed description it can be seen now that an improved light weight reel shaft is provided; also a strong connection of the reel heads to the shaft results; and, improved means for preventing damage to certain of the teeth is provided.

It is the intention to cover all changes and modifications not departing from the scope of the invention which has been defined in the following claims.

What is claimed is:

1. In a rake, a reel shaft carrying a polygonally shaped plate, a reel comprising a head having a recess to fit and receive the plate, and means to secure the plate and head together.

2. In a rake, a reel shaft having a plate welded thereto, a reel comprising a head having a hub portion formed with a recess into which said plate fits, and means to detachably secure the plate and head together.

3. In a rake, a hollow reel shaft having a triangularly shaped plate welded thereto, said shaft passing through the plate, a reel having a head formed with a hub portion having a triangularly shaped recess into which the plate fits, and means to secure the plate to the head.

4. In a rake, a reel shaft formed of a plurality of shaft sections arranged end to end, the adjoining ends of the sections having plates welded thereto, a reel head, and means securing the plates together to join the shaft sections, said means also connecting the reel head to the plates.

5. In a rake, a reel shaft formed of a plurality of hollow shaft sections arranged end to end, the adjoining ends of the sections being passed through and having polygonally shaped plates welded thereto, a reel head having a hub formed with a recess corresponding to the shape of the plates, and means to secure the plates together to join the shaft sections and to join the head to the plates, said plates being located in said hub recess.

6. A rake having a reel shaft, a head thereon including arms, bars carried by the arms, teeth on the bars, said arms being curved in a direction away from the end tooth on the bars to prevent the arm from damaging the said end tooth.

7. A rake having a reel shaft, a head thereon including arms, bars carried by the arms, teeth on the bars, and means on the bars adjacent the arms to prevent the adjacent teeth from clashing with the arms.

8. A rake having a reel shaft, a head thereon including arms, bars carried by the arms, teeth on the bars, and means on the bars adjacent the arms to prevent the adjacent teeth from clashing with the arms, said means comprising a sleeve including a tooth deflector extension.

ALEXUS C. LINDGREN.